United States Patent
Kubota (10) Patent No.: US 6,491,484 B2
(45) Date of Patent: Dec. 10, 2002

(54) MULTIPURPOSE FREIGHT VEHICLE

(76) Inventor: Masao Kubota, 1458-1 Iizukacho, Ota-Shi Gunma-Ken (JP)

( * ) Notice: Subject to any disclaimer, the term of this patent is extended or adjusted under 35 U.S.C. 154(b) by 0 days.

(21) Appl. No.: 09/737,773

(22) Filed: Dec. 18, 2000

(65) Prior Publication Data

US 2002/0076288 A1 Jun. 20, 2002

(51) Int. Cl.[7] ............................................ B60P 7/08
(52) U.S. Cl. ........................... 410/29.1; 410/4; 410/24; 410/26
(58) Field of Search ................ 410/4, 24, 26, 410/29.1; 187/213, 215, 253; 414/495

(56) References Cited

U.S. PATENT DOCUMENTS

| | | | | | |
|---|---|---|---|---|---|
| 2,520,698 | A | * | 8/1950 | Sniezyk | 410/29.1 |
| 4,701,086 | A | * | 10/1987 | Thorndyke | 410/26 |
| 4,801,229 | A | * | 1/1989 | Hanada et al. | 410/26 |
| 4,966,510 | A | * | 10/1990 | Johnson, Jr. | 410/26 |
| 4,992,013 | A | * | 2/1991 | Westerdale | 410/29.1 |
| 5,051,046 | A | * | 9/1991 | Oren | 410/29.1 |
| 5,938,382 | A | * | 8/1999 | Andre et al. | 410/24 |
| 6,027,290 | A | * | 2/2000 | Andre | 410/24 |
| 6,325,579 | B1 | * | 12/2001 | Jarvis | 410/26 |

* cited by examiner

Primary Examiner—Stephen T. Gordon
(74) Attorney, Agent, or Firm—Israel Gopstein (57) ABSTRACT

The multipurpose freight vehicle according to the present invention includes a lower deck capable of loading vehicles as freight thereonto, plural support posts standing up in an opposed state on both side edge portions of the lower deck, and an upper deck adapted to be lifted and lowered along the support posts. The support posts are supported so that they can be turned freely with respect to the lower deck in the direction of a vehicle width or in the longitudinal direction of the lower deck. The support posts are formed so that, when vehicles are not loaded onto the freight vehicle, the support posts can be housed in the lower deck by first lowering the upper deck, and then bringing down the support posts in the direction of a vehicle width or in the longitudinal direction of the lower deck. This enables when the freight vehicle is not loaded with freight the upper deck to be stored on the lower deck, and the support posts to be housed in an upper portion of or along side portions of the lower deck.

6 Claims, 11 Drawing Sheets

MULTIPURPOSE FREIGHT VEHICLE

BACKGROUND OF THE INVENTION

Field of the Invention

This invention relates to a structure having a lower deck, and an upper deck adapted to be lifted and lowered along support posts, and more particularly to a multipurpose freight vehicle capable of being used to transport vehicles; housing an upper deck in a lowered state in a lower deck freely by bringing down upper deck support posts; and transporting freight other than vehicles.

In general, a freight vehicle used exclusively for the transportation of vehicles as freight is made as a two-stage type or three-stage type freight vehicle provided with lower and upper decks so that a greater number of vehicles can be loaded thereonto at once.

Especially, the upper deck is usually made able to be lifted and lowered. Devices for lifting and lowering the upper deck include a link type device formed so as to support the upper deck on plural links operated by hydraulic cylinders, and a support post type device adapted to support the upper deck on plural support posts and lift and lower the same by using hydraulic cylinders and wires.

In a freight vehicle used to carry vehicles and using the support post type upper deck lifting and lowering device out of these devices, the support posts are stood up in an opposed state on both side edge portions of the lower deck, and the hydraulic cylinders are fixed to the respective support posts separately. Pulleys are fixed to retractable rods of the hydraulic cylinders, and the wires mentioned above are passed around the pulleys. One end portion of each of the wires is engaged with the upper deck, and the other end portion thereof the respective support posts. Therefore, when the pulleys are lifted and lowered by extending and retracting the rods of the hydraulic cylinders, the movements of the pulleys are transmitted to the upper deck via the wires, so that the upper deck is lifted and lowered.

Even in a freight vehicle using the support post type upper deck lifting and lowering device, the upper deck lifting and lowering operations are carried out practically by using a link mechanism.

However, according to the above-mentioned related art freight vehicle for transporting vehicles, using the support post type upper deck operating device, support posts are fixed to a vehicle body. Therefore, in order to load freight other than vehicles, for example, elongated steel materials onto a lowered upper deck from a side portion of the a vehicle body, the standing support posts obstruct the loading operation. Consequently, the loading and unloading of such elongated materials can be done only from the upper and rear portions of the vehicle body, so that efficient loading and unloading operations cannot be carried out.

On the other hand, in the freight vehicle using the link type upper deck lifting and lowering device, the upper deck lifting and lowering mechanism becomes complicated. The freight vehicle has a structure in which, even when the upper deck is in a lowered state, the link mechanism has to support at all times a rear portion of the upper deck. Therefore, the rear portion of the upper deck is put in an unstable half-sitting posture, and, even when the upper deck is in a lowered state, the upper deck is readily vibrated in the lateral direction during the travel of the freight vehicle.

SUMMARY OF THE INVENTION

The present invention provides a multipurpose freight vehicle formed so that an upper deck lowered and piled on a lower deck can be combined with the lower deck in a unitarized state, whereby a stable flat bed surface is secured, support posts being rendered able to be brought down with the upper deck lowered, in such a manner that the support posts do not obstruct freight loading and unloading operations, whereby the freight loading and unloading operations can be carried out from a side portion of a vehicle body.

The present invention also provides a multipurpose freight vehicle formed so that support posts standing in a mutually opposed state on both side portions of a lower deck can be folded on and housed in the lower deck with an upper deck lowered and piled on the lower deck, the support posts being thereby combined with the lower deck in a unitary state, whereby a flat floor surface is secured.

The present invention also provides a multipurpose freight vehicle is formed so that support posts standing on both side portions of a lower deck can be folded in the longitudinal direction of the lower deck and housed therein with upper deck lowered and piled on the lower deck, whereby the lower deck secures a flat bed surface.

The present invention further provides a multipurpose freight vehicle formed so that support posts standing on both side portions of a lower deck can be brought down with cylinders, which are fixed so as to extend along the support posts, in the longitudinal direction of the lower deck, vibration stopping rods being provided insertably between the standing support posts and cylinders so as to reduce vibrations of the support posts and cylinders to as great an extent as possible, and thereby stabilize the travel of the freight vehicle, whereby base end portions of the pivotably supported support posts can be protected against the breakage of the same end portions which is ascribed to the wear thereof due to the vibration of the support posts.

BRIEF DESCRIPTION OF THE DRAWINGS

Preferred embodiments of the present invention will be described in detail with reference to the following figures, wherein.

DESCRIPTION OF THE PREFERRED EMBODIMENTS

FIGS. 1–7 show a first embodiment of the present invention. A reference letter A denotes a multipurpose freight vehicle, and B a tractor for pulling the same vehicle.

Although the vehicle according to the present invention may be a truck type vehicle in which the multipurpose freight vehicle A and tractor B are combined together, the multipurpose freight vehicle A of this embodiment will be described as a trailer type vehicle.

Figure 1:
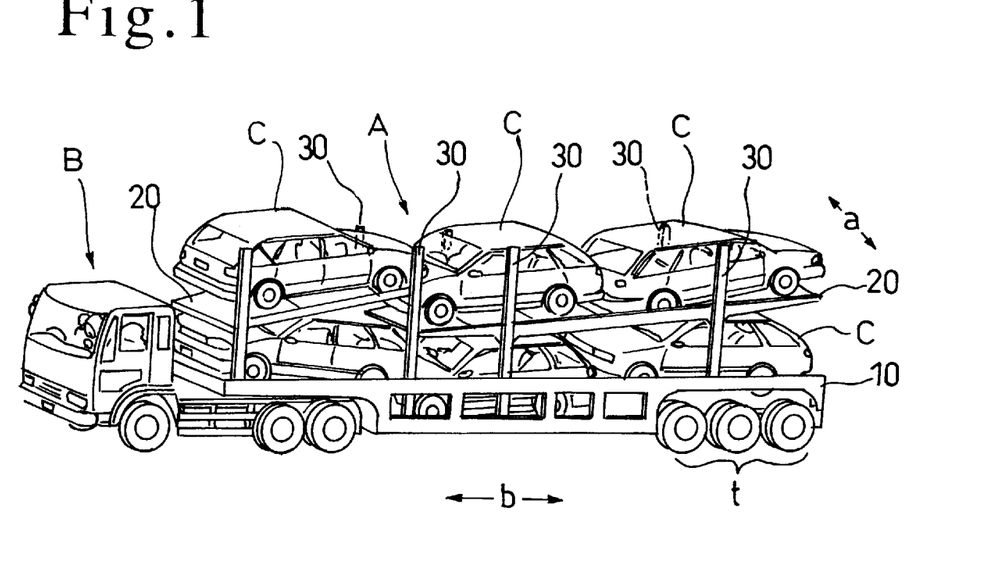
FIG. 1 is a perspective view of the multipurpose freight vehicle according to the present invention.

As shown in FIG. 1, the multipurpose freight vehicle A is joined at a front portion thereof to the tractor B, and supported at a rear portion thereof on its own wheels t. A reference numeral 10 denotes a lower deck, and 20 an upper deck. The lower and upper decks 10, 20 are formed so that a predetermined number of vehicles C as freight can be loaded thereonto. It is a matter of course that goods other than vehicles can also be loaded as freight onto these decks.

The upper deck 20 is supported on plural support posts 30 standing up at predetermined intervals and in an opposed state on both side edge portions of the lower deck 10 so that the upper deck can be lifted and lowered along the support posts 30. Each support post 30 is supported pivotably on the lower deck 10 so that the support post 30 can be brought down when the vehicles C are not loaded onto the lower deck 10, i.e., when the upper deck 20 lowered is piled on the lower deck 10.

Figure 2:
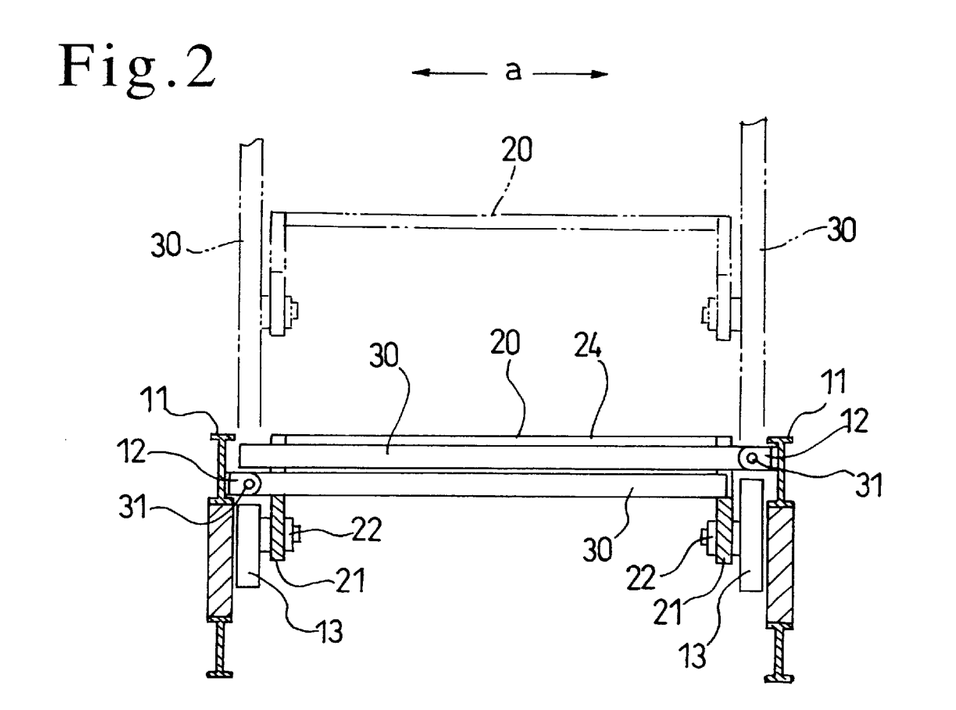
FIG. 2 is a front view in section showing a principal portion of the multipurpose freight vehicle according to the present invention.

As is clearly shown in FIG. 2, brackets 12 are fixed to I-shaped steel 11 constituting both side edge portions of the lower deck 10, and support shafts 31 fixed to base end portions of the support posts 30 are supported pivotably on these brackets 12, whereby each support post 30 can be pivotally moved.

Figure 3:
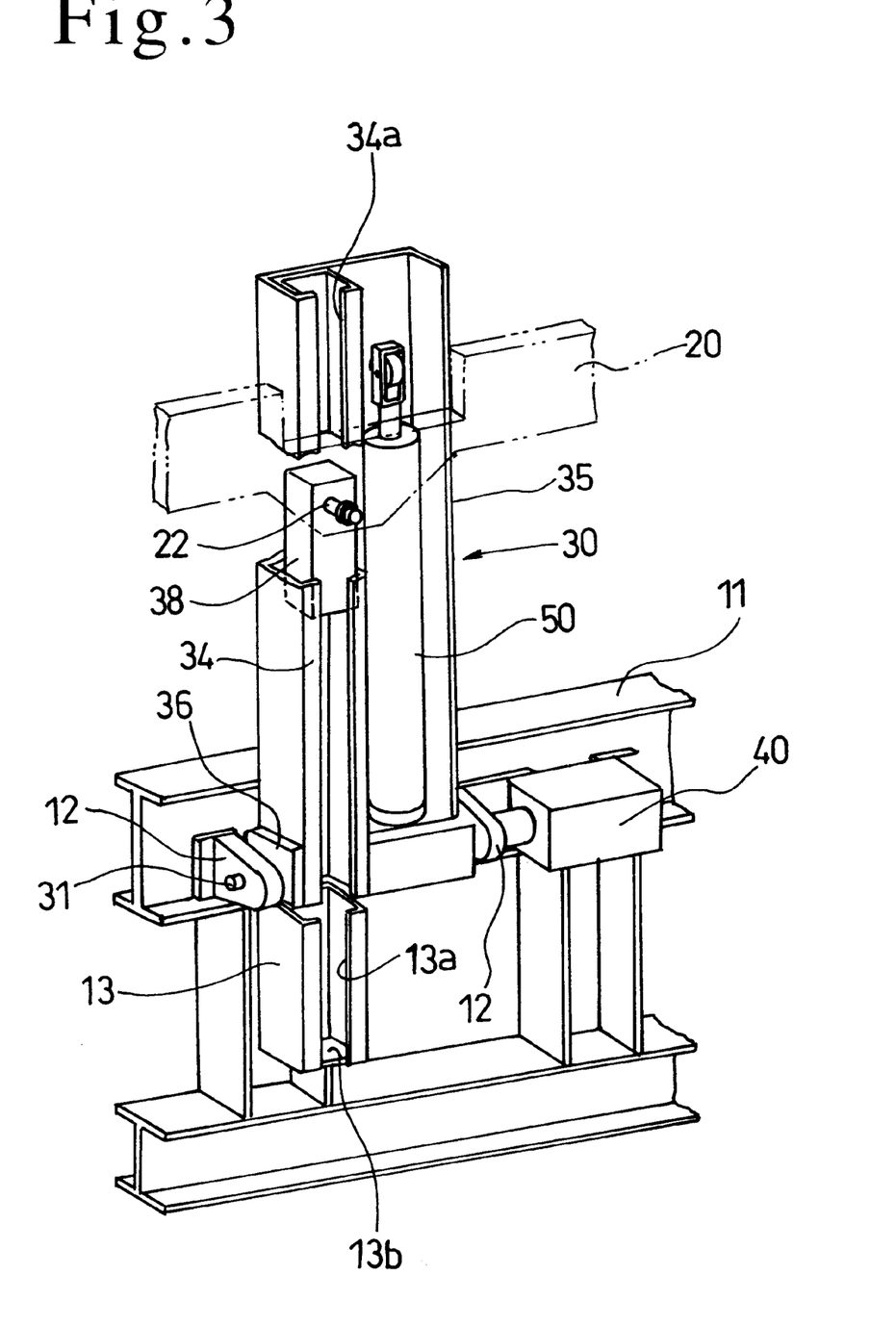
FIG. 3 is a perspective view showing a support post stood up.

As shown in FIG. 3, the support post 30 is formed by providing a tubular column member 34 fixedly in one side portion of the interior of cross-sectionally U-shaped grooved steel 35, inserting a hydraulic cylinder 50 into the other side portion of the interior of the grooved steel 35 so as to extend along the tubular column member 34, and fixing a reinforcing frame 36 formed of band steel to an outer surface of a lower portion of the grooved steel 35. Especially, the support shaft 31 is fixed to the reinforcing frame 36, and supported on the bracket 12. The tubular column member 34 in the support post 30 is provided with a continuous slit 34a extending in the longitudinal direction thereof, and a guide shaft 38 is provided vertically movably in the tubular column. A downwardly projecting leg 21 (refer to FIG. 2) at both sides of the upper deck 20 and a guide shaft 38 are connected together by a connecting shaft 22 passing through the slit 34a, whereby the upper deck 20 is supported on the opposed support posts 30, 30. Thus, when the support posts 30 stand up, the upper deck 20 can be lifted and lowered freely.

Figure 4:
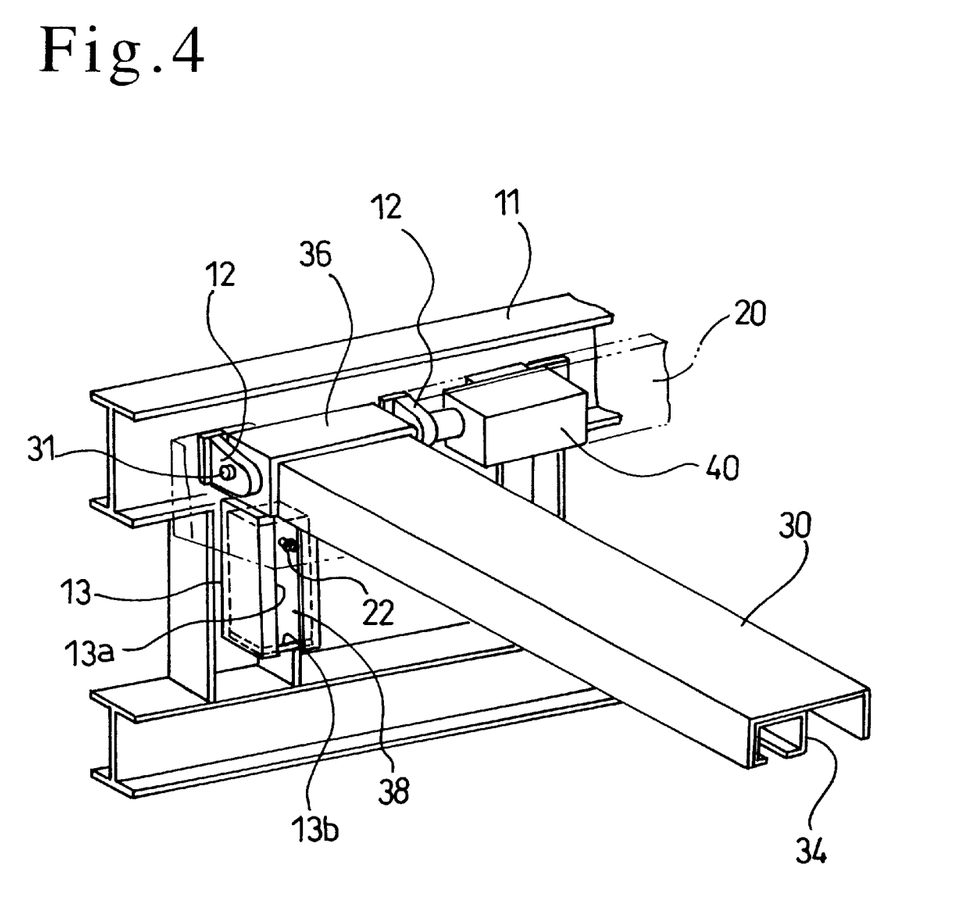
FIG. 4 is a perspective view showing the support post brought down.

Each support post 30 is provided with a receiving cylinder 13 fixed to a lower portion thereof. This receiving cylinder 13 is formed of a cylindrical body provided with a longitudinally extending slit 13a just as the cylindrical column member 34, and having a bottom surface 13b. The receiving cylinder 13 communicates with the cylindrical column member 34 when the support post 30 stands up. When the upper deck 20 lowers, the guide shaft 38 is introduced into the interior of the receiving cylinder 13, and, when the guide shaft 38 lowers in the interior of the receiving cylinder 13, so that the upper deck 20 reaches a lower end a downward stroke thereof, the support post 30 is put in a downwardly pivotable state as shown in FIG. 4.

Especially, each support post 30 is supported so as to be vibrated in the direction of a vehicle width a. As shown in FIG. 2, the opposite support posts 30, 30 are provided in a staggered manner so as to have different heights with respect to the support shafts 31, 31, a difference between which heights correspond to the thickness of each support post 30.

Figure 5:
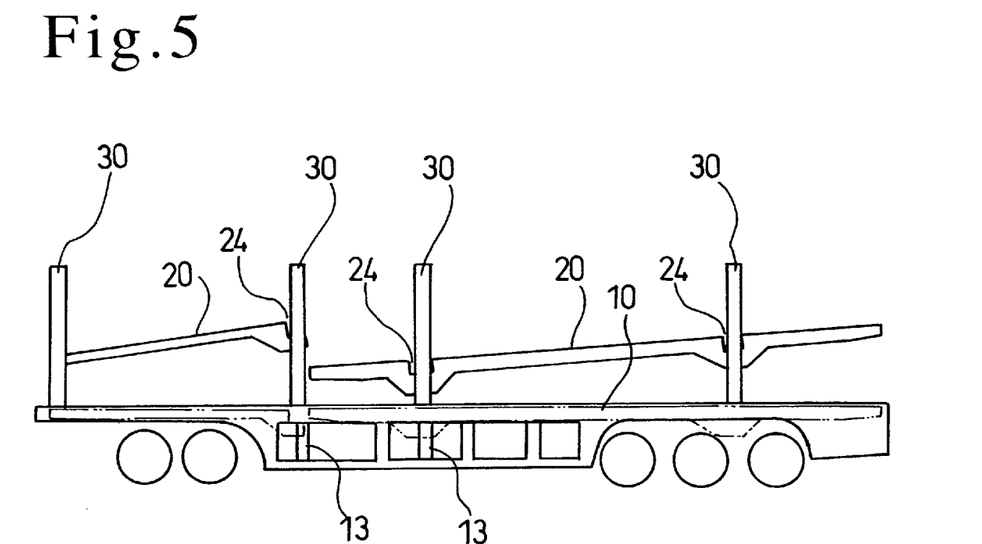
FIG. 5 is a schematic side view of the multipurpose freight vehicle.

As shown in FIG. 5, the upper deck 20 is provided in an upper surface thereof with plural grooves 24 extending in the direction of the vehicle width a, in which the support posts 30, 30 brought down are housed.

Therefore, when the opposed support posts 30, 30 are brought down in order in the inward direction with respect to the direction of the vehicle width a with the upper deck 20 lowered and piled on the lower deck 10 as shown in FIG. 2, the support posts 30, 30 are housed in a piled state in the groove 24 of the upper deck 20 as shown by solid lines. At this time, an outer surface of the upper side support post 30 housed in the groove 24 becomes flush with the deck surface, and the upper deck 20 is combined in a unitary state with the lower deck 10, whereby a generally stable flat bed surface is obtained. In this condition, various kinds of cargoes, such as elongated steel materials can be loaded onto the deck surface and unloaded therefrom easily from a side portion of the vehicle body. It is a matter of course that the support post 30 (left-hand support post in FIG. 2) the support shaft 31 of which is positioned lower is brought down first with the support post 30 (right-hand post in FIG. 2) the support shaft 31 of which is positioned higher thereafter brought down.

Figure 6:
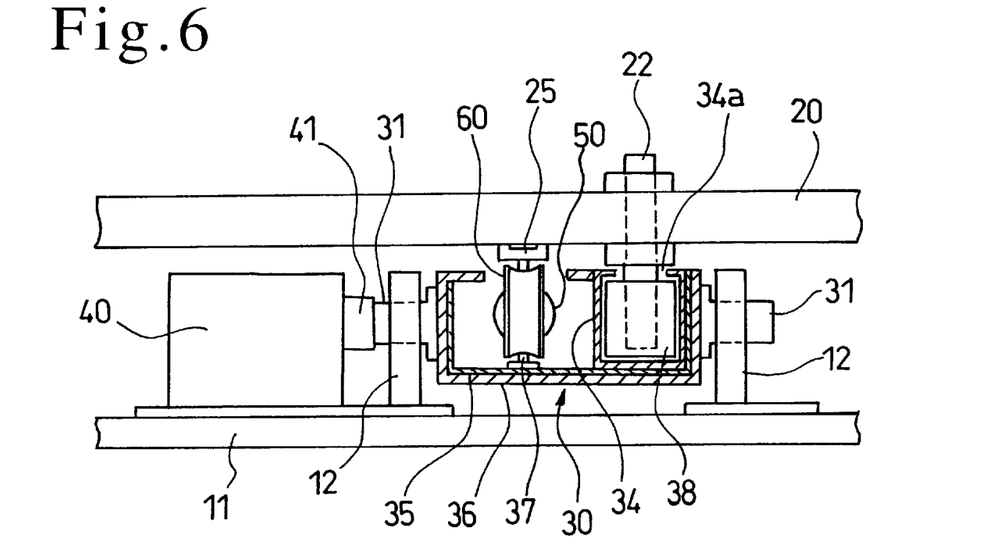
FIG. 6 is a plan view showing a principal portion of the multipurpose freight vehicle.

As is clearly shown in FIG. 6, a spline 41 connected directly to a hydraulic motor 40 is fitted around the support shaft 31 supporting the support post 30. Accordingly, when the power of this hydraulic motor 40 is transmitted to the support shaft 31 through the spline 41, the support post 30 can be turned with the support shaft 31 used as a fulcrum. A working oil for the hydraulic motor 40 is locked with the support post 30 standing up, so as to fix the support post 30.

Figure 7:
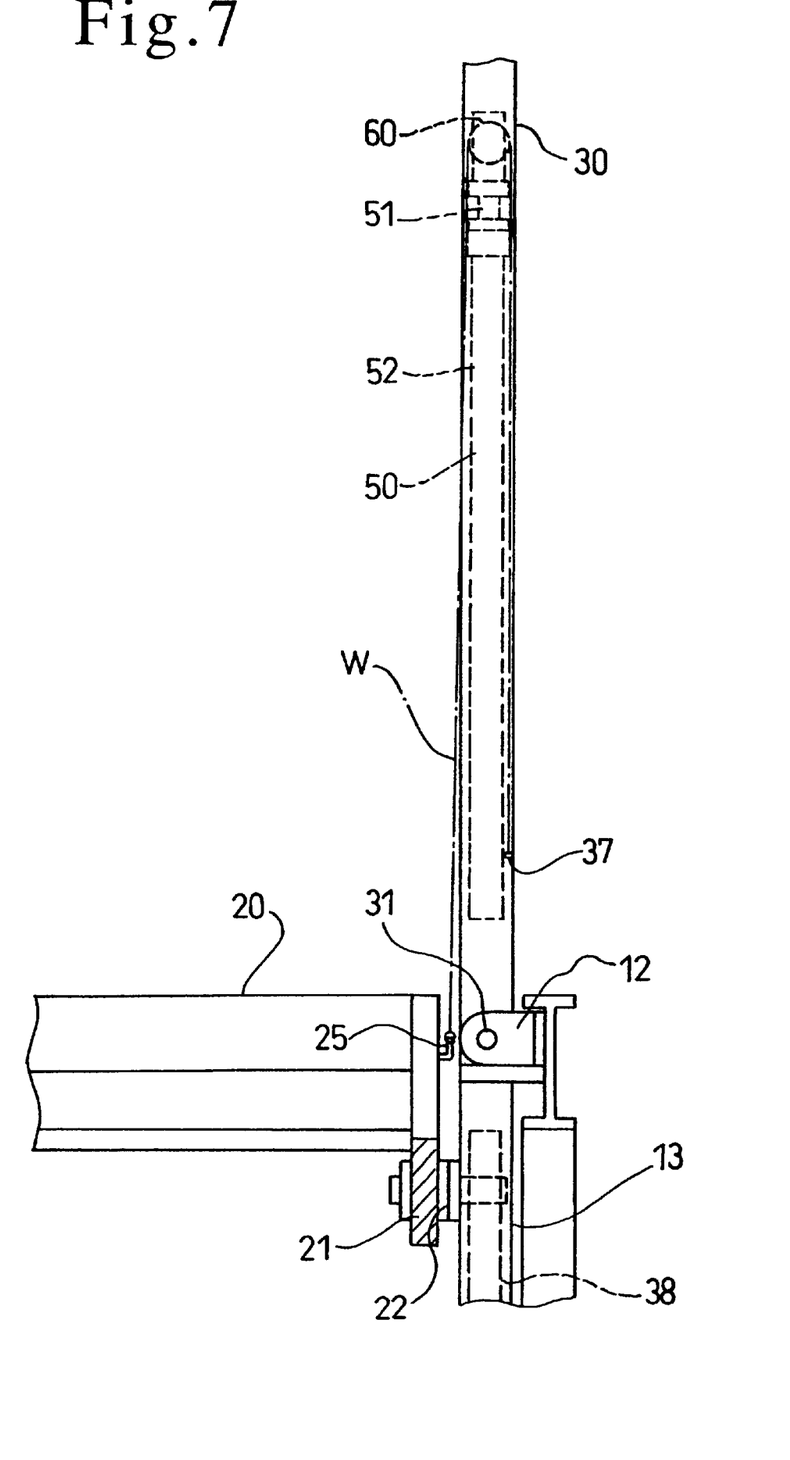
FIG. 7 is a front view showing a support post with a wire fixed thereto.

As shown clearly in FIG. 7, a pulley 60 served as a leading block is fixed to a retractable rod 51 of a hydraulic cylinder 50 contained in the support post 30, and a wire W is passed around the pulley 60. One end portion of this wire W is engaged with a hook 25 projecting from the upper deck 20, and the other end portion thereof a hook 37 projecting from the support post 30.

When the retractable rod 51 of the hydraulic cylinder 50 is extended and retracted, the first-mentioned end portion of the wire W fixed to the hook 25 is displaced by a distance two times as long as a stroke of the retractable rod 51, so that the upper deck 20 can be lifted and lowered with a stroke two times as large as that of the retractable rod 51 of the hydraulic cylinder 50. A portion to which the second-mentioned end portion of the wire W is fixed may be determined arbitrarily as long as it is the fixing portion of the support post 30 and that of a cylinder portion 52 of the hydraulic cylinder 50.

Accordingly, in the first embodiment of the multipurpose freight vehicle according to the present invention, the upper deck is moved up and down along the support posts owing to operations of deck lifting and lowering mechanisms. When the upper deck is lowered, the guide shafts are introduced from the support posts into the receiving cylinders, and stopped by bottom surfaces of the receiving cylinders. Namely, in the condition in which the upper deck lowered is piled on the lower deck, the hydraulic cylinders constituting the deck lifting and lowering mechanisms do not make an upper deck supporting action, and the guide shafts stopped by the bottom surfaces of the receiving cylinders necessarily support the upper deck. Consequently, the upper deck is combined in a unitary state with the lower deck to form a stable flat floor surface. At this time, the support posts can be brought down.

Especially, the support posts are brought down in the direction of the vehicle width. During this time, the mutually opposed support posts are housed in the grooves of the upper deck with the support posts folded and piled in order. In this condition, the outer surfaces of the support posts become flush with that of an upper surface of the upper deck without projecting out therefrom and sinking thereunder. When various kinds of cargoes are loaded onto the upper deck in this condition, the hydraulic cylinders are protected by the support posts. When the support posts are brought down, the unloading of the cargoes can be done from a side portion of the vehicle body.

FIGS. 8–13 show a second embodiment of the multipurpose freight vehicle according to the present invention.

Figure 8:
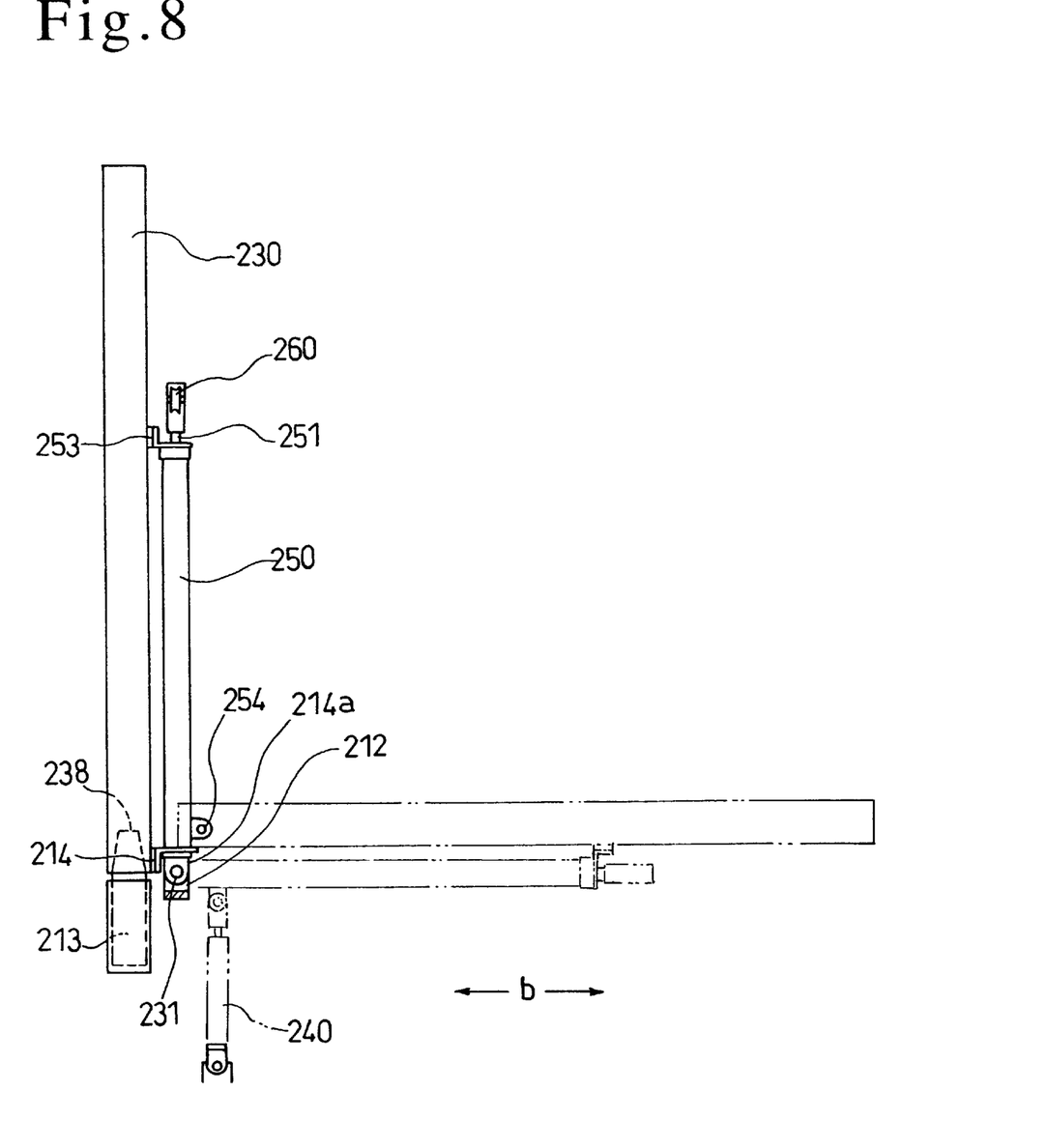
FIG. 8 is a side view of a principal portion of a multipurpose freight vehicle showing another embodiment of the present invention.

Referring to FIG. 8, a reference numeral 230 denotes a support post, and 250 a hydraulic cylinder. The hydraulic cylinder 250 is fixed to the support post 230 via a base seat 214 and a bracket 212, and a base end portion of the hydraulic cylinder 250 is supported pivotably on a support shaft 231 via the base seat 214. Also, the upper end portion of the hydraulic cylinder 250 is fixed on a support shaft 231 via the bracket 253. Therefore, it can be said that the support post 230 is also supported pivotably on the support shaft 231. Especially, the support shaft 231 is passed through a bearing 214a of the base seat 214 and connected pivotably to a bracket 212. The bracket 212 is fixed to an inner surface of I-shaped steel 211 (refer to FIG. 9) forming both side surfaces of the lower deck.

Thus, the support post 230 and hydraulic cylinder 250 are supported pivotably with respect to a longitudinal direction b (refer to FIG. 1) of the lower deck, and they are moved pivotally in a range defined by solid lines and imaginary lines shown in FIG. 8. Namely, the support post 230 and hydraulic cylinder 250 are brought down along an inner side surface of the I-shaped steel 211 and housed therein.

A pivotal movement of the support post 230 is made by connecting a rod of a cylinder 240 (hydraulic) supported pivotably on the I-shaped steel 211 of the lower deck to a projection 254 extending from a base end portion of a hydraulic cylinder 250, and pushing out the projection 254 therefrom or drawing the same thereinto. Some other systems can also be employed which include the system for connecting a driving shaft of a hydraulic motor to the support shaft 231 just as in the above-described first embodiment, a rack-carrying gear transmission system and a chain driving system. The locking oil for the cylinder 240 is locked when the support post 230 stands up, whereby the support post 230 is fixed.

Figure 11:
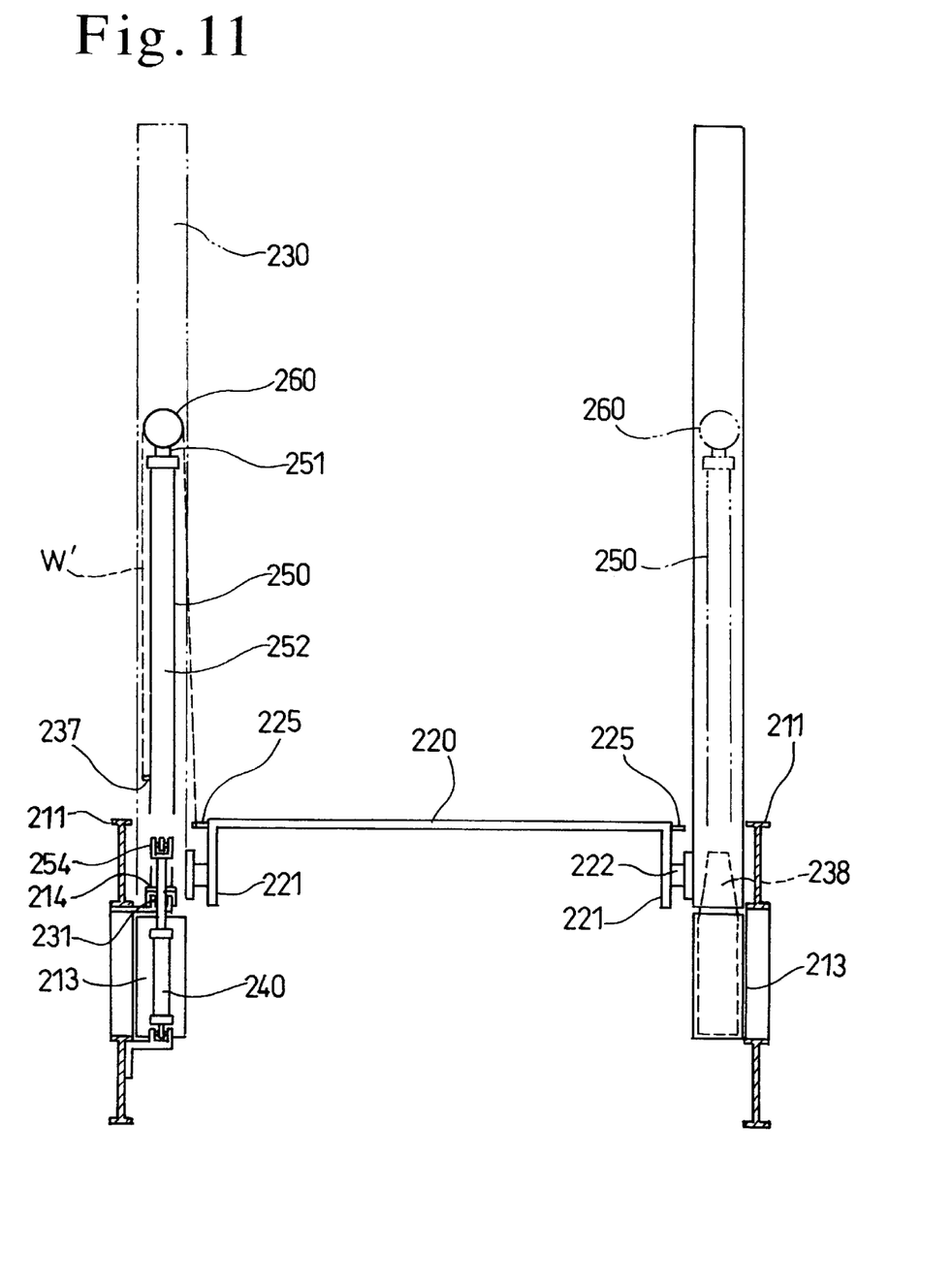
FIG. 11 is a front view in section showing a principal portion of the multipurpose freight vehicle.

The support post 230 is a tubular body having a longitudinally extending slit 230a, and a guide shaft 238 is provided therein so that the guide shaft 238 can be moved up and down freely. This guide shaft 238 and a leg portion 221 of the upper deck 220 are connected together by a connecting shaft 222, which passes through the slit 230a, as shown in FIG. 11, and the upper deck 220 is rendered vertically movable when the support post 230 stands up.

Figure 10:
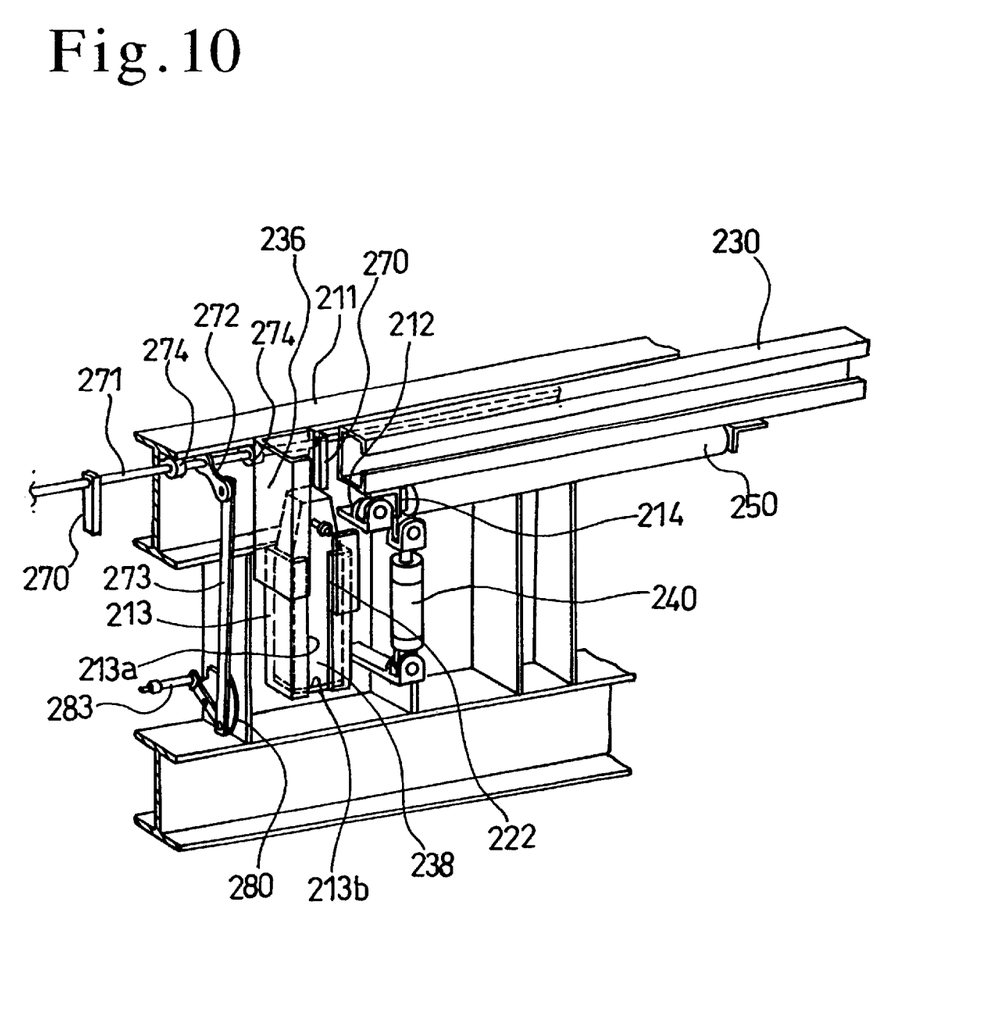
FIG. 10 is a perspective view showing the support post brought down.

Below the support post 230, a receiving cylinder 213 is fixedly provided. This receiving cylinder 213 is a tubular body having a longitudinally extending slit 213a and a bottom surface 213b. The receiving cylinder 213 is provided so as to communicate with the support post 230 when the support post 230 stands up. When the upper deck 220 is in a lower end of a downward stroke thereof, the guide shaft 238 is introduced into the receiving cylinder 213. At this time, the guide shaft 238 is received by the bottom surface 213b of the receiving cylinder 213, and the upper deck 220 is retained in a position of descent thereof In this condition, the support post 230 can be brought down along an inner side surface of the lower deck as shown in FIG. 10.

A pulley 260 serving as a leading block is fixed to a retractable rod 251 of the hydraulic cylinder 250 in the same manner as in the previously-described first embodiment, and a wire W' is passed around this pulley 260. One end portion of this wire W' is fixed to a hook 225 of the upper deck 220, and the other end portion thereof a hook 237 projecting from a cylinder portion 252 of the hydraulic cylinder 250. The portion to which the second-mentioned end portion of the wire W' is fixed may be determined arbitrarily as long as it is a part, to which the end portion is fixed, of the support post 230 and cylinder portion 252 of the hydraulic cylinder 250.

In the second embodiment, the upper deck 220 and support posts 230 are also housed in the form of a flat bed in the interior of the lower deck, so that various kinds of cargoes can be loaded onto the upper surface of the upper deck even when the upper deck is in a housed state.

Figure 9:
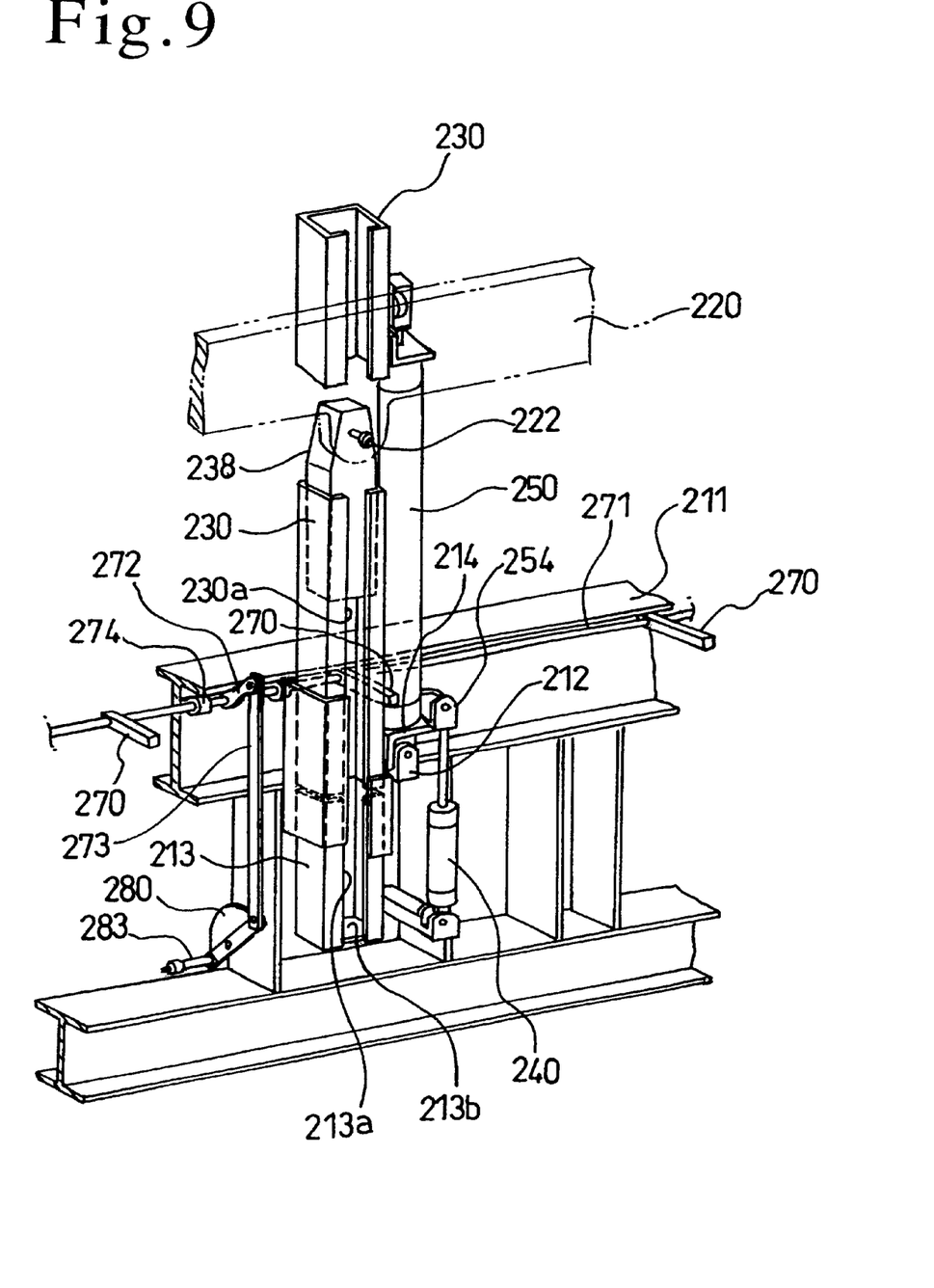
FIG. 9 is a perspective view showing a support post stood up.

In this second embodiment, vibration stopping rods 270 are inserted as shown in FIG. 9 into a clearance between the support post 230 and hydraulic cylinder 250 which stand up, so as to reduce to as great an extent as possible the vibration of the support post 230 during the travel of the freight vehicle.

Figure 12:
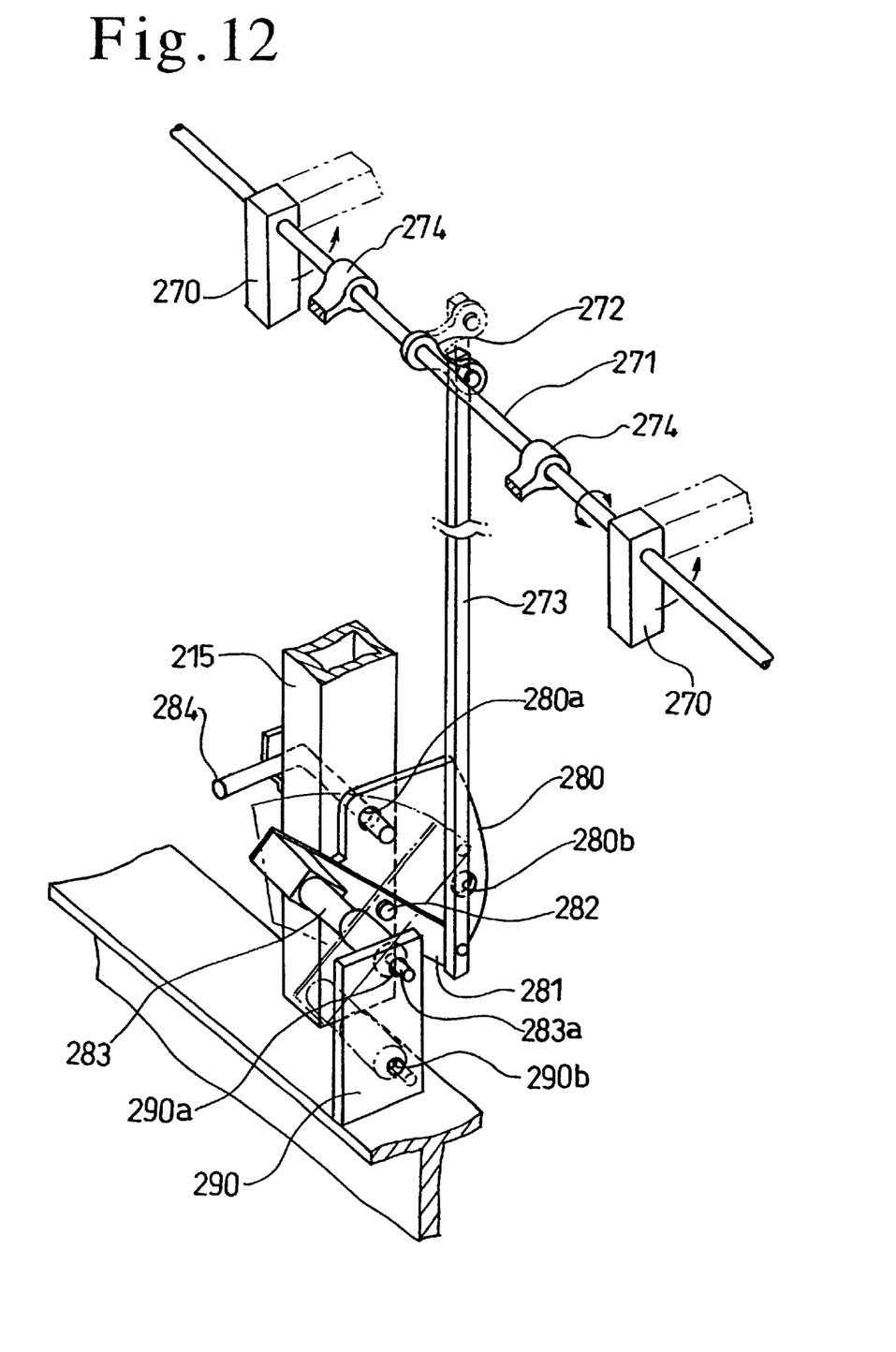
FIG. 12 is a perspective view showing a vibration stopping rod operating assembly.

As shown in FIG. 12, the vibration stopping rod 270 is positioned on the inner side of the I-shaped steel 211 of the lower deck, and fixed at a base end portion thereof to a crankshaft 271. A crank 272 is fixed at one end portion thereof to the crankshaft 271, and connected pivotably at the other end portion thereof to a connecting rod 273. The connecting rod 273 extends perpendicularly, and is joined at a lower end portion thereof to an end portion of an operating plate 280.

Figure 13:
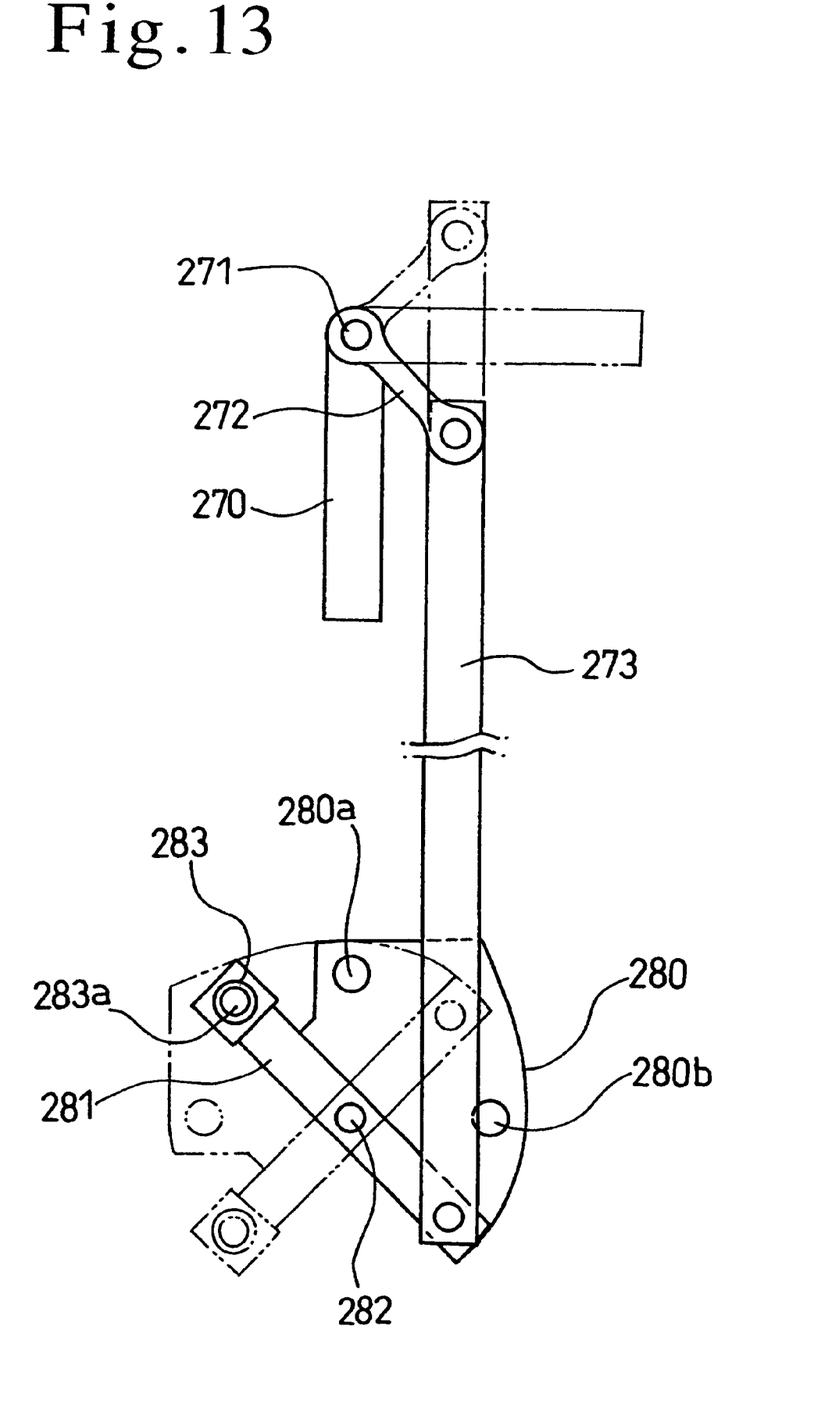
FIG. 13 is a front view showing the vibration stopping rod in operation.

As shown in FIG. 13, the operating plate 280 is formed to a substantially semicircular shape having a rectangular edge portion 281. The operating plate 280 is fixed pivotably at a substantially intermediate part of the rectangular edge portion 281 to a vertical frame 215, which supports the I-shaped steel 211 of the lower deck, via a pivot 282, and a lower end portion of the connecting rod 273 is joined pivotably to one end part of the rectangular edge portion 281. A rod handle 283 is joined to the other end part of the rectangular edge portion 281 so that the rod handle 283 projects perpendicularly with respect to a surface of the operating plate 280.

The operating plate 280 is provided with an opening retaining locking hole 280a and a closure retaining locking hole 280b in the portions thereof which are on a circle having the pivot 282 as its center, and which arc spaced from cache other at 90°. The vertical frame 215 on which this operating plate 280 is provided has one locking hole, and a bolt is passed through both this hole and one of the locking holes 280a, 280b which is aligned with the locking hole of the frame. The operating plate 280 is turned within a range of 90° around the pivot 282 to select the opening retaining locking hole or closure retaining locking hole 280a or 280b, align one of these locking holes with the locking hole of the frame, and have a locking bolt 284 pass through the two aligned locking holes. In a position in which the opening retaining locking hole 280a is aligned with the locking hole of the frame, the connecting rod 273 is pulled down, and the vibration stopping rod 270 is held in a position away from a space between the support post 230 and hydraulic cylinder 250. In a position in which the closure retaining locking hole 280b is aligned with the locking hole of the frame, the connecting rod 273 is lifted, and the vibration stopping rod 270 is turned at 90° and held horizontally in an insertion position between the support post 230 and hydraulic cylinder 250.

A front end surface of the rod handle 283 becomes able to be moved forward and backward in the axial direction by a spring (not shown), and a short shaft 283a made integral with the rod handle projects from the same front end surface thereof. A fixing plate 290 is set vertically on the horizontal frame 216 forming the lower deck, and provided with two through holes 290a, 290b through which the short shaft 283a of the rod handle 283 is inserted, whereby the rod handle 283 can be held fixedly in opening and closure positions.

It is preferable that the crankshaft 271 be provided as shown in FIG. 9, so as to extend at each of both sides of the vehicle body in the longitudinal direction of the inner side of the I-shaped steel 211 of the lower deck via bearings 274, and that the vibration stopping rods 270 the number of which corresponds to those of the support posts 230 and hydraulic cylinders 250 be provided.

A reinforcing frame 236 formed of band steel is provided fixedly on an outer surface of the receiving cylinder 213. This reinforcing frame 236 is fixed to an upper portion of the receiving cylinder 213 so as to be wound therearound in an upwardly projecting state. This reinforcing frame 236 is opened at the side thereof which faces in the direction in which the support post 230 is brought down, and has an opened slit 230a. When the support post 230 stands up, the base end portion thereof is reinforced and fixed by the reinforcing frame 236, whereby the vibration of the support post 230 during the travel of the vehicle is held down to as great an extent as possible. Thus, the support post 230 is protected against the breakage thereof, which is ascribed to the friction of joint portions of the support post 230 and receiving cylinder 213 with each other, owing to a combination of both the reinforcing effect of the frame 236 and the vibration stopping effect of the mentioned rod 270.

The device for lifting and lowering the upper deck may also be formed of a structure which is obtained by providing a rack on the support post, and providing a lift base fixedly on a chain feed mechanism operated by an oscillating motor, and which is operated by locking the lift base by the upper deck, moving the upper deck up and down, and retaining the lift base rack in a predetermined position. A sprocket may be substituted for the pulley as the upper deck lifting and lowering mechanism, and a chain for the wire.

Accordingly, in the second embodiment, the support posts are brought down in the longitudinal direction of the lower deck, and housed at the same time in an upper deck-contacting state in the lower deck. In the condition in which the support posts are brought down, goods, such as elongated steel materials can be loaded onto and unloaded from the freight vehicle via a side portion thereof. Especially, since the support posts are brought down in the longitudinal direction of the vehicle body, they can be stood up again after the freight is loaded onto the vehicle, so that preventing function of the freight collapse of the support posts is fulfilled.

Moreover, the provision of the vibration stopping rods, which are inserted between the support posts and hydraulic cylinders, and reinforcing frames wound around the receiving cylinders enables the vibration of the support posts ascribed to the lateral and longitudinal vibrations of the traveling freight vehicle to be reduced to as great an extent as possible, the travel of the freight vehicle to be stabilized, and the freight vehicle to be protected as much as possible against the breakage of the support posts, which is ascribed to the friction of the joint portions at the lower end parts thereof.

What is claimed is:

1. A multipurpose freight vehicle comprising plural support posts stood up in an opposed state on both side edge portions of a lower freight-loadable deck, and an upper deck provided on the support posts and adapted to be moved up and down by upper deck lifting and lowering mechanisms, each support post being supported on a support shaft so that the support post can be turned in the direction of a vehicle width, the support shafts of the opposed support posts being provided in positions of different heights with respect to the lower deck, a series of grooves being provided in an upper surface of the upper deck so as to extend in the direction of the vehicle width, the opposed support posts being housed in a piled state in the grooves with the upper deck in a lower end of a downward stroke thereof.

2. A multipurpose freight vehicle comprising plural support posts stood up in an opposed state on both side edge portions of a lower freight-loadable deck, and an upper deck provided on the support posts and adapted to be moved up and down by upper deck lifting and lowering mechanisms, each support post being supported on a support shaft so that the support post can be turned freely in the longitudinal direction of the lower deck, each support post being thereby adapted to be brought down along a side portion of the lower deck with the upper deck in a lower end of a downward stroke thereof, wherein the support posts supported on the lower deck so that the support posts can be turned freely in the longitudinal direction of the lower deck are provided with vibration stopping rods capable of being inserted with the support posts standing up, into clearances between the support posts and hydraulic cylinders fixed so as to extend along the support posts.

3. A multipurpose freight vehicle according to claim 1, wherein each support post is provided with a guide shaft joined to the upper deck so that the guide shaft can be moved up and down freely, a receiving cylinder into which the guide shaft is introduced with the upper deck in a lower end of a downward stroke thereof being provided below the support post.

4. A multipurpose freight vehicle according to claim 1, wherein the upper deck lifting and lowering mechanisms include a hydraulic cylinder provided fixedly in each said support post, a pulley provided on a free end of a retractable rod of the hydraulic cylinder, and a wire engaged at one end portion thereof with the upper deck, and at the other end portion thereof to a fixing portion, which includes the support post, via the pulley.

5. A multipurpose freight vehicle comprising plural support posts stood up in an opposed state on both side edge portions of a lower freight-loadable deck, and an upper deck provided on the support posts and adapted to be moved up and down by upper deck lifting and lowering mechanisms, each support post being supported on a support shaft so that the support post can be turned freely in the longitudinal direction of the lower deck, each support post being thereby adapted to be brought down along a side portion of the lower deck with the upper deck in a lower end of a downward stroke thereof, wherein each support post is provided with a guide shaft joined to the upper deck so that the guide shaft can be moved up and down freely, a receiving cylinder into which the guide shaft is introduced with the upper deck in a lower end of a downward stroke thereof being provided below the support post.

6. A multipurpose freight vehicle comprising plural support posts stood up in an opposed state on both side edge portions of a lower freight-loadable deck, and an upper deck provided on the support posts and adapted to be moved up and down by upper deck lifting and lowering mechanisms, each support post being supported on a support shaft so that the support post can be turned freely in the longitudinal direction of the lower deck, each support post being thereby adapted to be brought down along a side portion of the lower deck with the upper deck in a lower end of a downward stroke thereof, wherein the upper deck lifting and lowering mechanisms include a hydraulic cylinder provided fixedly in each said support post, a pulley provided on a free end of a retractable rod of the hydraulic cylinder, and a wire engaged at one end portion thereof with the upper deck, and at the other end portion thereof to a fixing portion, which includes the support post, via the pulley.

* * * * *